United States Patent [19]
Seibert

[11] 3,939,077
[45] Feb. 17, 1976

[54] HORIZONTAL VACUUM BELT FILTER MACHINE

[75] Inventor: Kenneth T. Seibert, Wilmington, Del.

[73] Assignee: Straight Line Filters, Inc., Wilmington, Del.

[22] Filed: Dec. 20, 1974

[21] Appl. No.: 534,834

[52] U.S. Cl. ............................................. 210/401
[51] Int. Cl.² ........................................ B01D 33/14
[58] Field of Search ........... 210/160, 400, 401, 406, 210/526, DIG. 3; 198/184, 190, 193; 74/241; 162/367

[56] References Cited
UNITED STATES PATENTS

| | | | |
|---|---|---|---|
| 1,767,905 | 2/1926 | Walher | 210/DIG. 3 |
| 1,927,849 | 9/1933 | Roberts | 210/DIG. 3 |
| 2,101,109 | 12/1937 | Thomson | 162/367 |
| 3,069,921 | 12/1962 | Davis | 210/DIG. 3 |
| 3,105,817 | 10/1963 | Seibert | 210/406 X |
| 3,190,451 | 6/1965 | Holland | 210/406 X |
| 3,518,161 | 6/1970 | Ekberg et al. | 162/367 |
| 3,762,561 | 10/1973 | Davis | 210/401 |
| 3,802,094 | 4/1974 | Isoda | 198/190 |

Primary Examiner—Theodore A. Grange
Attorney, Agent, or Firm—Connolly and Hutz

[57] ABSTRACT

Horizontal vacuum belt filter machine comprises frame with spaced apart drums journaled to frame and endless belt structure mounted on drums. Endless belt structure has upper horizontal path of travel and comprises multiple longitudinally oriented endless belt segments arranged in side-by-side fashion with overlapping joint between adjacent edge portions of belt segments. Drums include first arrangement comprising multiple drums equal in number to multiple endless belt segments with each of multiple drums associated with separate one of belt segments. Drums further include second arrangement comprising single drum for multiple belt segments. Endless filter medium covers endless belt structure in area of upper horizontal path of belt travel, and suction device in area of upper horizontal path of belt travel cooperates with endless belt structure and filter medium for withdrawing liquid from slurry-like materials deposited upon filter medium.

6 Claims, 4 Drawing Figures

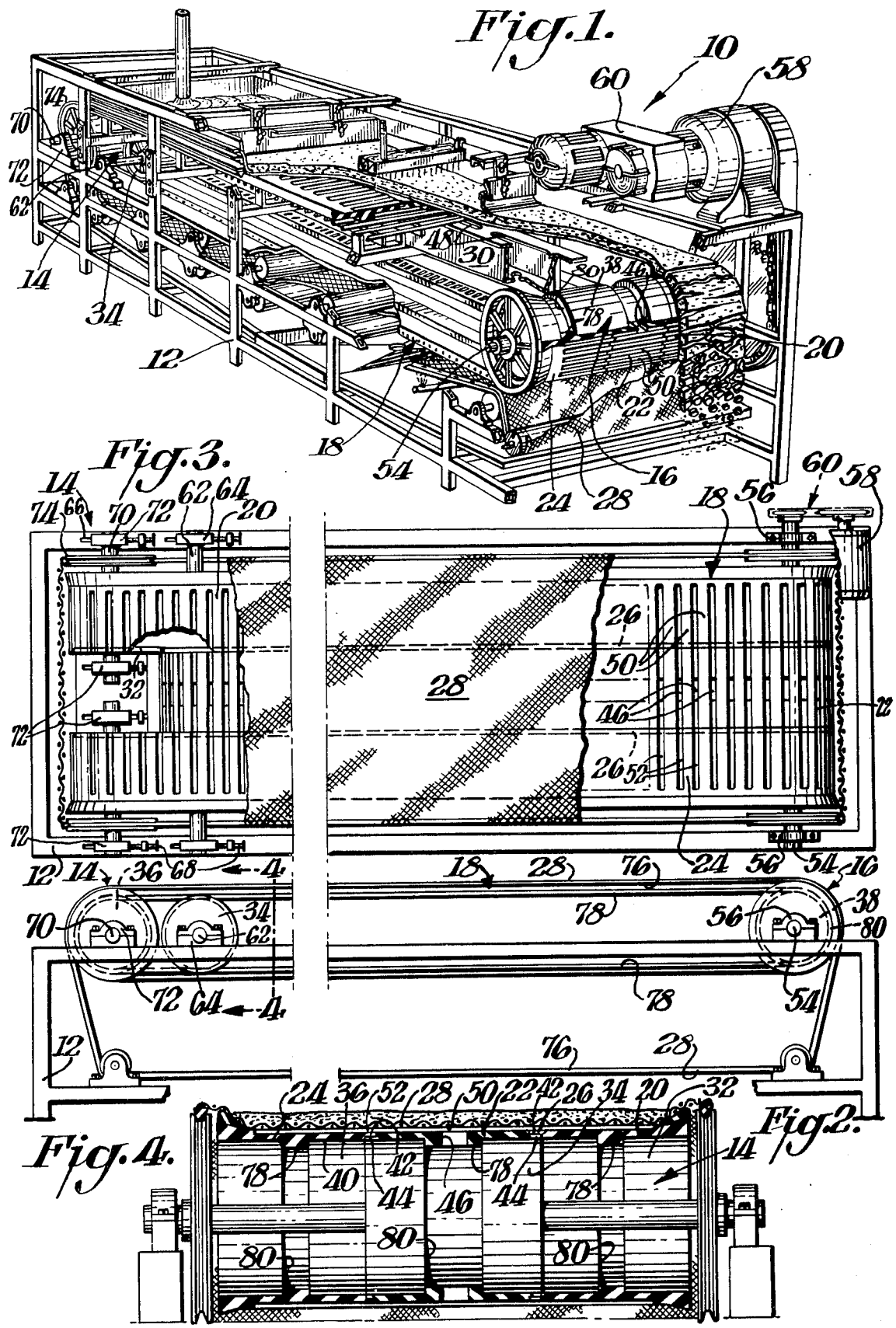

HORIZONTAL VACUUM BELT FILTER MACHINE

BACKGROUND OF THE INVENTION

The present invention relates to a horizontal vacuum belt filter machine, and more particularly to an endless belt filter machine wherein the endless belt comprises multiple longitudinally oriented endless belt segments arranged in side-by-side fashion.

Generally, endless belt filters are known in the art such as the machine described in U.S. Pat. No. 3,190,451, granted June 22, 1965. Basically, these machines comprise an endless single belt mounted on drums journaled to the frame of the machine. An endless filter medium is supported by the endless belt on the top side thereof, and suction supplied to selected openings in the bottom of the belt functions to withdraw water from slurry-like materials deposited upon the filter medium. Ultimately, the filter cake is removed from the filter medium at the discharge end of the machine. Heretofore, most belt filter machines of the above described type include a single endless belt of a unitary or one-piece nature, or one fabricated from two or more pieces cemented or otherwise secured together into a single unitary member. Such a construction is not only difficult to handle and assemble but proper tensioning and tracking of the belt for extended periods of operation are difficult, if not impossible, to achieve.

Belt filter machines have also been proposed that include a plurality of drainage belts trained around spaced apart rotatable drums with a continuous gap left between adjacent edges of the belts through which filtrate drainage is effected. Such a machine is shown in U.S. Pat. No. 3,426,908, granted Feb. 11, 1969. The belts of these machines do not cooperate with one another to form a unitary unit, and instead are spaced apart to provide the drainage characteristics.

SUMMARY OF THE INVENTION

Accordingly, it is an object of the present invention to provide a unique and beneficial belt filter machine which avoids the shortcomings of existing machines by including an endless belt construction that comprises multiple longitudinally oriented endless belt segments engaging one another and arranged in side-by-side fashion.

Another object of the present invention is to provide a belt filter machine having multiple longitudinally oriented endless belt segments arranged in side-by-side fashion with a vacuum tight overlapping joint between adjacent edge portions of the belt segments.

Still another object of the present invention is to provide a belt filter machine having multiple drums upon which multiple endless belt segments are mounted for individually controlling the tensioning and tracking of each belt segment.

In accordance with the present invention, a horizontal vacuum velt filter machine comprises a frame with spaced apart drums journaled to the frame and a longitudinally oriented endless belt structure mounted on the drums. The endless belt structure has an upper horizontal path of travel and comprises multiple longitudinally oriented endless belt segments arranged in side-by-side fashion with an overlapping joint between adjacent edge portions of the belt segments. The drums include a first arrangement that comprises multiple drums equal in number to the multiple endless segments with each of the multiple drums associated with a separate one of the belt segments. The drums further include a second arrangement that comprises a single drum for the multiple belt segments. An endless filter medium covers the endless belt structure in the area of the upper horizontal path of belt travel, and a suction device in the area of the upper horizontal path of belt travel cooperates with the endless belt structure and the filter medium for withdrawing liquid from slurry-like materials deposited upon the filter medium.

Preferably, the endless belt structure comprises three longitudinally oriented endless belt segments, and one of the belt segments includes an undercut side edge portion in its base portion while the adjacent belt segment includes a cutout side edge portion in its base portion. As a result, the undercut side edge portion of one of the belt segments mates with the cutout side edge portion of the adjacent belt segment to provide the overlapping joint.

Preferably, the first drum arrangement is at one end of the frame and defines the feed end of the machine while the second drum arrangement is at the opposite end of the machine where it defines the discharge end of the machine. Also, the single drum of the second drum arrangement may be driven. In the preferred embodiment of the invention, the first drum arrangement includes three individual drums two of which are journaled to the frame along the same axis while the remaining drum is journaled to the frame along a different axis spaced from the other. The middle drum of the three drums of the first drum arrangement is journaled to the frame along an axis different from the axis along which the two side drums of the first drum arrangement are journaled to the frame.

BRIEF DESCRIPTION OF THE DRAWING

Novel features and advantages of the present invention in addition to those mentioned above will become apparent to those skilled in the art from a reading of the following detailed description in conjunction with the accompanying drawing wherein similar reference characters refer to similar parts and in which:

FIG. 1 is a perspective view illustrating a horizontal vacuum belt filter machine according to the present invention;

FIG. 2 is a side elevational view of the machine of FIG. 1 with the central portion thereof broken away;

FIG. 3 is a top plan view of the machine of FIG. 1 with the central portion thereof broken away; and FIG. 4 is an enlarged sectional view taken along line 4—4 of FIG. 2.

DETAILED DESCRIPTION OF THE INVENTION

Referring in more particularity to the drawing, a horizontal vacuum belt filter machine 10 is shown, according to the present invention. Generally, machines of this type include an endless filter medium and endless drainage belt structure with a system for supporting and driving the filtering and drainage belt structure. A suction box imparts vacuum to the area of the filter medium for the purpose of withdrawing liquid from slurry-like materials deposited thereon.

Particularly, the horizontal vacuum belt filter machine 10 comprises a frame 12 fabricated from tubular metal or similar material, and spaced apart drum arrangements 14, 16 are journaled to the frame, as explained more fully below. A longitudinally oriented endless belt structure 18 is mounted on the drum arrangements 14, 16 so that the belt structure is trained around them. The endless belt structure has an upper horizontal path of travel where the filtering action is accomplished. Moreover, the endless belt structure 18 comprises multiple longitudinally oriented endless belt segments 20, 22, 24 arranged in side-by-side fashion with an overlapping joint 26 between adjacent edge portions of the belt segments along the upper horizontal path of belt travel. An endless filter medium 28 covers the endless belt structure 18 in the area of the upper horizontal path of belt travel, and, as shown in the drawing, a suction box 30 in that area of belt travel cooperates with the endless belt structure 18 and the filter medium 28 for withdrawing liquid from slurry-like materials deposited on the filter medium.

The endless filter medium 28 may comprise a foraminous wire of metal, cloth, plastic composition or the like. Also, the endless belt structure 18 in the form of the multiple belt segments 20, 22, 24 may be constructed of any suitable flexible material such as rubber, plastic composition, rubber and fabric, or the like.

The spaced apart drum arrangements 14, 16 include a first arrangement 14 at the end of the frame 12 that defines the feed end of the machine 10. The second drum arrangement 16 is located at the opposite end of the frame 12 and defines the discharge end of the machine 10. The first drum arrangement 14 comprises multiple individual drums 32, 34, 36 equal in number to the multiple endless belt segments 20, 22, 24 of the endless belt structure 18. Each of the multiple drums 32, 34, 36 is associated with a separate one of the individual belt segments that comprise the endless belt structure 18. The second drum arrangement 16 at the discharge end of the machine 10 comprises a single drum 38.

As shown best in FIG. 4, each of the endless belt segments 20, 22, 24 includes a base portion 40. The middle belt segment 22 has a cutout portion 42 along each of its opposite side edges, and the cutouts are located in the base portion 40 of the segment 22. The belt segments 20, 24 on opposite sides of the middle belt segment 22 each include an undercut portion 44 along the side edge adjacent the middle segment 22. The undercuts in the side belt segments 20, 24 are located in the base portion 40 of these segments, and the cooperation between the cutouts 42 and undercuts 44 occurs along the upper horizontal path of belt travel to provide the overlapping joints 26 between adjacent edge portions of the individual belt segments.

A series of spaced apart drainage openings 46 is provided in the middle belt segment 22. These openings cooperate with openings 48 in the suction 30 to impart vacuum to the material deposited upon the filter medium 28, as explained more fully below. The upper half of the belt segments carries a plurality of individual transversely extending ribs 50 integrally associated with the base portions 40 of the belt segments. The ribs 50 are spaced apart but parallel to one another and serve to support the endless filter medium 28 along the upper horizontal path of belt travel. Also, the ribs define filtrate receiving grooves 52 that communicate with the drainage opening 46 in the middle belt segment 22 during the filtering operation.

The single drum 38 at the discharge end of the machine 10 is secured to a shaft or axle 54 which is journaled to the frame 12 by journal blocks 56. The single drum 38 provides the drive for the endless belt structure 18. In this connection, a suitable motor 58 is provided together with a transmission 60 for drivingly connecting the motor to the shaft 54. At the feed end of the machine 10 where the three multiple drums 32, 34, 36 are located, the middle drum 34 is journaled to the frame 12 by a shaft or axle 62 and journal blocks 64. Each block 64 is adjustably mounted to the frame by a bearing guide slot 66 and an adjustable screw assembly 68 for positioning the block along the slot 66 at various positions on the frame. With such an arrangement, the middle belt segment 22 is easily tensioned the appropriate amount by anchoring the blocks 64 to the frame 12 at a position which will provide the appropriate belt tension. Two oppositely positioned shafts or axles 70 are provided for securing the individual side drums 32, 36 to the frame 12 of the machine 10. Journal blocks 72 secure each shaft 70 to the frame and the position of these blocks relative to the frame is adjustable in the same manner as the blocks 64 associated with shaft 62. With such an arrangement the belt segments 20, 24 may be appropriately tensioned in the same manner as described above in connection with the proper tensioning of belt segment 22.

A free-running pulley 74 is secured at each end of the shaft 54 for the single driven drum 38 at the discharge end of the machine 10. Shaft 70 at the feed end of the machine 10 also carries a free-running pulley 74 at each end thereof. As shown best in FIGS. 3 and 4, two V-belts 76 are trained around the pulleys, and the sides of the endless filter medium 28 are attached to the V-belts for movement therewith. This arrangement provides proper tracking of the filter medium 28 during the filtering operation and the movement of the belt structure 18. The weight of the slurry-like material deposited upon the filter medium 28 provides sufficient frictional engagement between the filter 28 and the ribs 50 of the belt structure 18 which support the filter. As a result, the filter 28 and belt 18 move together as a unit when the motor 58 is energized and slurry-like material is deposited upon the filter.

In operation, slurry-like material is deposited upon the endless filter medium 28 at the feed end of the machine 10. The liquid or filtrate in the slurry material passes through the medium onto the endless belt structure 18 into the filtrate receiving grooves 52 between the ribs 50. The ribs 50 being slightly spaced apart and parallel to one another serve to support the medium 28 above the grooves 52. Suction is continuously applied to the grooves 52 between the ribs via the suction box 30, as the openings 48 therein communicate with the drainage openings 46 in the middle belt segment 22. As the belt segments 20, 22, 24 and the filter medium 28 travel toward the discharge end of the machine 10, more and more liquid is withdrawn from the material deposited on the filter medium. Ultimately, the substantially dry filter cake on top of the medium 28 reaches the discharge end of the machine where it is removed, by gravity, a blast of air pressure or the like, as is well known. The return of the endless filter medium 28 and belt segments 20, 22, 24 takes place on the underside of the machine 10. The filter medium 28 may be washed along the return, as is well known.

The overlapping joint 26 between the edge portions of adjacent belt segments occurs along the upper horizontal path of belt travel and effectively prevents leakage of the liquid at these lines of overlapping connection. Also, it is significant that the overlapping joints 26 along the upper path are subjected to suction from the box 30, and this suction urges adjacent belt segments into intimate contact with one another at the joints so that the segments move together as a single unit. Relative movement between adjacent belt segments along the upper path of belt travel is thereby prevented. It is equally significant that the particular drum arrangements 14, 16 enable individual tensioning of the three belt segments that comprise the endless belt structure 18. Such construction facilitates handling and assembling of the belt structure 18 on the drums of the machine, and provides proper tensioning and tracking of the belt segments for extended periods of filtering operation. By properly tensioning and tracking each belt segment slippage between the segments is prevented and the overall belt structure moves a single unit along the upper horizontal path of belt travel.

Additionally, each belt segment includes a downwardly extending continuous tab 78 on the underside thereof. The tabs fit within annular grooves 80 in the drum arrangements 14, 16 to thereby insure proper tracking of the belts relative to the drum arrangements. The fluid-tight seals 26 are also maintained by the structural relationship between the tabs 78 and grooves 80. Moreover, it is also understood that the endless belt structure may comprise two, four or other combinations of belt segments instead of the three segments shown in the drawing and described above.

What is claimed is:

1. In a horizontal vacuum belt filter machine of the type comprising a frame, spaced apart drum means journaled to the frame at opposite ends thereof, endless belt means mounted on the drum means having an upper horizontal path of travel and comprising a plurality of separate longitudinally aligned endless belt segments, an endless filter medium supported upon the endless belt means in the area of the upper horizontal path of travel, and suction means beneath the upper horizontal path of travel cooperating with the endless belt means and the filter medium for withdrawing liquid from slurry-like material deposited upon the filter medium, the improvement being characterized by the spaced apart drum means at one end of the frame including a plurality of independent drums having the plurality of endless belt segments mounted thereon, each independent drum being jounaled upon an axle for rotation independently of the others, and means for adjusting the longitudinal spacing of the axles relative to each other.

2. The combination of claim 1 in which the spaced apart drum means includes a single drum at the end of the frame opposite the plurality of independent drums, and wherein each of the endless belt segments is trained around the single drum.

3. The combination of claim 2 in which the single drum is driven.

4. The combination of claim 1 wherein the endless belt means comprises three longitudinally aligned endless belt segments and the plurality of independent drums comprises three in number, one for each belt segment.

5. The combination of claim 4 in which two of the three independent drums are journaled to the frame along substantially the same axis and the remaining drum is journaled to the frame along a different axis spaced from the other.

6. The combination of claim 5 in which the middle drum of the three independent drums is journaled to the frame along an axis different from the axis along which the two side drums are journaled to the frame.

* * * * *